United States Patent
Appel et al.

(10) Patent No.: US 12,152,158 B2
(45) Date of Patent: Nov. 26, 2024

(54) GRAPHITE LEAD OR GRAPHITE CHALK OR GRAPHITE BLOCK, PENCIL WITH GRAPHITE LEAD, AND METHOD FOR PRODUCING A GRAPHITE LEAD OR GRAPHITE CHALK OR GRAPHITE BLOCK

(71) Applicant: FABER-CASTELL AG, Stein (DE)

(72) Inventors: Reiner Appel, Gnotzheim (DE); Joachim Kinzel, Stein (DE); Silke Bachmann, Nuremberg (DE); Gerhard Lugert, Nuremberg (DE)

(73) Assignee: FABER-CASTELL AG, Stein (DE)

( * ) Notice: Subject to any disclaimer, the term of this patent is extended or adjusted under 35 U.S.C. 154(b) by 850 days.

(21) Appl. No.: 17/208,072

(22) Filed: Mar. 22, 2021

(65) Prior Publication Data
US 2021/0292589 A1   Sep. 23, 2021

(30) Foreign Application Priority Data

Mar. 23, 2020   (EP) .................................. 20164990

(51) Int. Cl.
*C09D 13/00* (2006.01)
*B43K 19/18* (2006.01)
*B43K 19/02* (2006.01)

(52) U.S. Cl.
CPC .............. *C09D 13/00* (2013.01); *B43K 19/18* (2013.01); *B43K 19/02* (2013.01)

(58) Field of Classification Search
CPC ......... C09D 13/00; B43K 19/18; B43K 19/02
USPC ............................................ 106/31.01, 31.12
See application file for complete search history.

(56) References Cited

U.S. PATENT DOCUMENTS

2020/0115581 A1*   4/2020   Gouerec ................ B43K 19/18

FOREIGN PATENT DOCUMENTS

| AU | 2014331388 A1 * | 4/2016 | ............. B43K 19/02 |
|---|---|---|---|
| CN | 109385147 A | 5/2022 | |
| DE | 4214396 A1 | 11/1992 | |
| JP | 2001064561 A | 3/2001 | |
| JP | 2005060666 A | 3/2005 | |
| JP | 2007246605 A | 9/2007 | |

OTHER PUBLICATIONS

European Application No. 20164990.2 European Search Report dated Sep. 25, 2020.
Office Action as received in Chinese application 202110309715.5 dated May 17, 2022.

* cited by examiner

*Primary Examiner* — James E McDonough
(74) *Attorney, Agent, or Firm* — Keller Preece PLLC

(57) ABSTRACT

The invention relates to a graphite lead or graphite chalk or graphite block for drawing and painting, having a base body made of a base mass at least containing a cellulose-based binding agent, a filler, and graphite, the base body being impregnated with a waterproof preparation mixture containing at least a mixture of iso-paraffins and n-paraffins or a water-soluble preparation mixture containing at least a water-soluble emulsifier.
The invention also relates to a pencil with such a graphite lead and to a method for producing a graphite lead or graphite chalk or a graphite block.

13 Claims, No Drawings

GRAPHITE LEAD OR GRAPHITE CHALK OR GRAPHITE BLOCK, PENCIL WITH GRAPHITE LEAD, AND METHOD FOR PRODUCING A GRAPHITE LEAD OR GRAPHITE CHALK OR GRAPHITE BLOCK

CROSS-REFERENCE TO RELATED APPLICATIONS

This application claims the benefit of, and priority to, European Application No. 20164990.2, filed Mar. 23, 2020. The aforementioned application is hereby in-corporated by reference in its entirety.

SUMMARY

The invention relates to a graphite lead or graphite chalk or graphite block, to a pencil having a graphite lead, and to a method for producing a graphite lead or graphite chalk or graphite block.

Conventional graphite leads and chalks are usually made from a mixture of clay and graphite. The two very finely pulverized materials are mixed together homo-geneously with water in kneaders or alternatively high-speed mixers. Strands of lead or chalk are extruded from the resulting aqueous granulate using extrusion presses and are cut to the desired length. The cut-to-length lead or chalk strands are then dried at temperatures of up to 140° C. The raw leads or raw chalks obtained in this way are then subjected to ceramic firing at temperatures of 800 to 1100° C. in order to obtain sufficient strength. After the fired leads or chalks have cooled down, they are immersed in an oil/wax melt at elevated temperatures of around 80 to 90° C.

The disadvantage of such classic graphite leads is that it is difficult to produce very soft degrees of hardness, such as 12B or 14B, since these leads do not have sufficient mechanical strength at a diameter of typically 2 to 3 mm. The degree of hardness of graphite leads is determined by the mixing ratio of graphite and clay, wherein the graphite lead becomes softer as the proportion of graphite increases. It is not possible to make a possible auxiliary addition of cellulose-based binding agents to the aqueous clay and graphite mixture for very soft degrees of hardness, since, with noticeable amounts of cellulose-containing binding agents within the ceramic fire, the graphite leads burst or tear due to the sintering process. In addition, such graphite leads always show a more or less pronounced gloss in the strokes when using commercially available types of graphite.

The object of the invention is therefore to provide a graphite lead or graphite chalk or graphite block, in particular for artistic applications on paper and cardboard or wood, which, in particular, has a soft or very soft degree of hardness with sufficient mechanical strength and with which matte strokes with a matte black gradation can be produced.

The first-mentioned object is achieved using a graphite lead or graphite chalk or graphite block for drawing and painting that has the features according to claim 1.

The graphite lead or graphite chalk or graphite block for drawing and painting comprises a base body made of a base mass containing at least one cellulose-based binding agent, a filler, and graphite, wherein graphite is contained in a proportion between 4 and 30% by weight, and wherein the base body is impregnated with a preparation mixture containing so-called white paraffin waxes, specifically at least one mixture of iso-paraffins and n-paraffins. Alternatively, the base body can be impregnated with a water-soluble preparation mixture containing at least one water-soluble emulsifier.

The idea of the invention is thus to produce a so-called post-waxed lead, post-waxed chalk, or post-waxed block in which a cellulose-based binding agent, for example cellulose or cellulose derivatives, in particular carboxymethyl cellulose, is used. Graphite is added as a pigment.

Another essential aspect for achieving matte strokes is inventively achieved using the composition of the waterproof preparation mixture (or: oil/wax melt) into which the base body, also referred to as raw lead, raw chalk, or raw block, is immersed after its production. White paraffin waxes having a content of n- and iso-paraffins have proven to be particularly suitable here. According to ISO 2207, the paraffin waxes used have a solidification point between 52 and 56° C. and, according to ISO 2176, a dripping point between 52 and 56° C. Penetration at 25° C. (DIN51579) is 15 to 19, with the penetration needle penetrating 0.1 mm deep. The viscosity at 110° C. is between 2 and 4 mPas (DIN53019). In addition, the paraffins have an oil content of max. 0.5% by weight. It is also possible to use a water-soluble preparation mixture which contains water-soluble emulsifiers.

In contrast to previously known, fired graphite leads, inventive graphite-containing solid leads or chalks or—rectangular or square—blocks for drawing and painting, in particular for artistic applications on paper or cardboard or wood, lead to matte surfaces on the applied strokes or applied areas after application to or drawing on the painting surfaces. In addition to the standard degrees of hardness such as HB, B, 2B, 6B to 8B, it is also possible to achieve extremely soft and black appliable leads or chalks with degrees of hardness up to 14B, since the graphite lead, graphite chalk, or the graphite block becomes softer by impregnating the base body in the preparation mixture according to the inventive composition.

For graphite, a proportion of between 4 and 30% by weight in the base mass or base body has proven to be suitable for producing sufficiently black strokes.

For the sake of simplicity, primarily graphite leads are referred to below, but the statements made also apply to graphite chalk and graphite blocks.

In particular, an inorganic filler is used as the filler, for example kaolin, calcium carbonate, pumice powder, or clay. The use of kaolin has been found to be particularly suitable.

The binding agent makes it possible, among other things, to achieve better ma-chinability of the base mass and better shaping of the base body. Furthermore, the binding agent can in particular ensure the required mechanical strength of the raw leads, raw chalks, or raw block or base body. A proportion of binding agent between 0.5 and 6% by weight in the base material has proven to be advantageous.

The filler is preferably contained in the base material or the base body in a proportion between 40 and 90% by weight.

In conventional graphite lead production, graphite types having a grain size distribution of $x_{10}=1.8$ μm, $x_{50}=6.9$ μm, and $x_{90}$ of 16.9 μm, and having a carbon content between 95 to 98% by weight are used. Tests with various types of graphite have shown, however, that graphite having a grain size distribution $x_{10}=0.9$ μm, $x_{50}=3.3$ μm, $x_{90}=14.6$ μm, and a carbon content ("loss on ignition") of 88 to 92% by weight is particularly suitable. In particular with the value $x_{50}$, the preferred graphite type at 3.3 μm has significantly smaller particle sizes than the standard type, which has a value $x_{50}$ of 6.9 μm. The HELOS device and the WINDOX5 grain size software were used as a method for particle size analysis.

According to one advantageous embodiment, carbon black is additionally contained in the base material in order to adjust a soft or very soft degree of hardness, such as, for example, 4B, 5B, 6B, 10B, 12B or 14B.

Limiting the proportion of carbon black to a maximum of 35% by weight has proven advantageous here.

As needed, the graphite lead or graphite chalk or graphite block can contain other customary additives, in particular a lubricant, for example calcium stearate, and/or a surfactant and/or emulsifiers, which are added to the base material during the production of the graphite lead or graphite chalk or graphite block in order to improve the processability of the starting materials.

According to one advantageous embodiment, the proportion of additives is a maximum of 5% by weight.

In summary, the following composition can be specified as the formula for the base material for producing the base body for matte graphite leads or graphite chalks or graphite blocks:

| Cellulose-based binding agents: | 0.5-6% by weight |
|---|---|
| Kaolin filler: | 40-90% by weight |
| Graphite: | 4-30% by weight |
| Carbon black: | 0-35% by weight |
| Additives: | 0-5% by weight |

For the composition of the waterproof preparation mixture, the use of a mixture of iso-paraffins and n-paraffins with a proportion between 10 to 50% by weight is particularly recommended.

Furthermore, the addition of a fatty acid to the waterproof preparation mixture, in particular stearin, that is, a mixture of stearic acid and palmitic acid, or stearic acid, is particularly suitable in order to improve the stroke properties of the graphite lead.

Advantageous concentrations of the fatty acid are between 25 and 70% by weight.

Furthermore, triglycerides and/or other wax-like components, in particular fatty acid derivatives or polyolefin waxes, in particular functionalized metallocene polyolefin wax, or ethylene vinyl acetate wax, particularly preferably in concentrations of up to 40% by weight, can be added to the waterproof preparation mixture to further improve the stroke properties.

In summary, the following preferred composition can be specified as a formula for a waterproof preparation mixture:

| Stearin: | 25 to 70% by weight |
|---|---|
| iso-/n-paraffin mixture: | 10 to 50% by weight |
| Triglycerides: | 0 to 40% by weight |

The second-mentioned object is achieved with a pencil having the features according to claim 12, which comprises a graphite lead having the features described above. The pencil has in particular a sheathing made of wood or a wood substitute material ("wood plastic compound") which encloses the graphite lead. Alternatively, the pencil is a mechanical pencil, for example a fine lead pencil, which is equipped with graphite leads.

The third object is achieved according to claim 13 using a method for producing a graphite lead or graphite chalk or graphite block, in particular a graphite lead or graphite chalk or graphite block according to the composition described above, comprising the following steps:

During the production of the graphite lead, graphite chalk, or graphite block, a base body is first produced from a base material at least containing a cellulose-based binding agent, a filler, in particular an inorganic filler, preferably kaolin, and graphite (step a)).

The base body is produced in particular as described below:

First (step a1)), the starting materials, that is, the binding agent, the filler, and the graphite and, if appropriate, further additives, e.g., lubricants such as calcium stearate or surfactants, are mixed dry and homogenized. For soft or very soft degrees of hardness, finely powdered carbon black is also added as a starting material.

After the powder-like starting materials have been homogenized in kneaders or mixers, water is added, in particular in such an amount that its proportion—depending on the required degree of hardness—is about 20-32% by weight of the base mass in order to obtain a moist granulate (step a2)). After the water has been added, the mixture of base material and water is homogenized again.

The water-containing base mass obtained in this way is then extruded or pressed by means of extrusion, in particular in so-called extrusion presses or cylinder presses under high pressure to form graphite lead strands and/or graphite chalk strands and/or graphite blocks, and cut to length (step a3)).

The still flexible, extruded graphite chalks and/or graphite leads and/or graphite blocks are then dried (step a4)). The graphite leads are preferably dried in cans at temperatures of up to 130° C. while turning. To dry the graphite chalks or graphite blocks, these are preferably coated on metal sheets and dried at temperatures from room temperature to 40° C.

Then the base body or the raw lead, raw chalk, or raw block obtained in this way is impregnated in a waterproof preparation mixture containing white paraffin waxes, specifically at least a mixture of iso-paraffins and n-paraffins, or in a water-soluble preparation mixture containing at least one water-soluble emulsifier (step b)). This is preferably done by introducing the base body or the raw lead or raw chalk or raw block into a so-called rectangular preparation box. If a waterproof preparation mixture is used, it is melted at 80 to 100° C. and the base body is immersed overnight. The impregnation time for leads with a diameter of 3.3 mm is 12 to 24 hours, the total wax absorption being between 10 and 25% by weight, depending on lead diameter and cellulose content.

In a final step (step c)), the excess preparation mixture is removed from the impregnated base body, preferably by means of a centrifuge.

Below are five different compositions that are used as starting materials for producing the base mass, as well as two different compositions for the waterproof preparation mixture.

Example 1: Graphite block with dimensions of approx. 50 mm×20 mm×10 mm, degree of hardness 14B:

| Carboxymethyl cellulose (CMC100): | 2.5% by weight |
|---|---|
| Kaolin: | 51.5% by weight |
| Graphite: | 19% by weight |
| Carbon black: | 26.7% by weight |
| Additive, Genapol PF 80 FP[1)]: | 0.3% by weight |

The preparation mixture used to produce the graphite block according to Example 1 contains:

| | |
|---|---|
| Stearic acid[2] | 60% by weight |
| Iso-paraffin/n-paraffin wax mixture[3] | 15% by weight |
| Triglycerides[4] | 25% by weight |

Further Examples 2 through 5, each for producing a graphite lead having a diameter of about 3 mm, but with different degrees of hardness, are summarized in the following Table 1 (all information is provided in percent by weight):

TABLE 1

| | Example 2: Degree of hardness HB | Example 3: Degree of hardness 8B | Example 4: Degree of hardness 12B | Example 5: Degree of hardness 14B |
|---|---|---|---|---|
| Cellulose binding agent CMC 100 | 4 | 4 | 4 | 4 |
| Kaolin | 86.0 | 65.4 | 55.1 | 49.95 |
| Graphite | 10 | 15.6 | 18.4 | 19.8 |
| Carbon black | 0 | 15.0 | 22.5 | 26.25 |

A waterproof preparation mixture having the following composition is used for each of Examples 2 through 5:

| | |
|---|---|
| Stearin[5]: | 40% by weight |
| Iso-paraffin/n-paraffin mixture[3]: | 30% by weight |
| Triglycerides[4]: | 30% by weight |

After the graphite leads or graphite block was produced, strokes were produced on a painting base, in this case paper, and assessed with regard to the stroke properties.

The graphite leads create a matte, uniform stroke on paper. The gloss value was measured according to the following method:

| | |
|---|---|
| Device: | Micro-TRI-gloss from BYK 60° angle. |
| Reference values: | 95 GP highest gloss value |
| | 2 GP lowest gloss value |
| Color density measured with: | X-Rite exact |
| Reference value: | 1.90 color density for optimal black |

The results of the measurement of the graphite leads with a composition according to the above Examples 3 and 5 and of three comparison leads with a degree of hardness of 8B are summarized in Table 2 below.

TABLE 2

| | Color density, black | Gloss |
|---|---|---|
| Faber-Castell matte black, 8B (Example 3) | 1.46 | 7 GP |
| Faber-Castell matte, 14B (Example 5): | 1.63 | 8 GP |
| Faber-Castell standard lead Castell 8B | 1.32 | 19 GP |
| Competitor product, made in Germany, degree of hardness 8B: | 1.33 | 16 GP |
| Competitor product, Asia, matte, 8B: | 1.30 | 23 GP |

Based on these objective results of the measurement, it can be demonstrated that in particular the type of paraffin used together with the type of graphite used produces a graphite lead that has a significantly reduced gloss level (7 or 8 GP) compared to commercially available standard leads (16 to 23 GP).

Furthermore, the stroke produced with the inventive graphite leads provides a stronger and more opaque black than with the comparison leads.

Product Names/Manufacturer:
1) Clariant AG, D-65929 Frankfurt am Main
2), 3), 4), 5) Wachs- und Ceresin Fabriken Th. C. Tromm GmbH, Feuerstrasse 7 to 17, D-50735 Cologne

The invention claimed is:

1. Graphite lead or graphite chalk or graphite block for drawing and painting, comprising a base body made of a base mass containing at least one cellulose-based binding agent, wherein the binding agent is contained in a proportion between 0.5 and 6% by weight, a filler, and graphite, wherein graphite is contained in a proportion between 4 and 30% by weight, and wherein the base body is impregnated with a waterproof preparation mixture containing at least a mixture of iso-paraffins and n-paraffins or with a water-soluble preparation mixture containing at least a water-soluble emulsifier.

2. Graphite lead or graphite chalk or graphite block according to claim 1, wherein the filler is an inorganic filler, in particular kaolin.

3. Graphite lead or graphite chalk or graphite block according to claim 1, wherein the filler is contained in a proportion between 40 and 90% by weight.

4. Graphite lead or graphite chalk or graphite block according to claim 1, wherein the graphite has a grain size distribution $x_{10}=0.9$ μm, $x_{50}=3.3$ μm, $x_{90}=14.6$ μm, and a carbon content of 88 to 92% by weight.

5. Graphite lead or graphite chalk or graphite block according to claim 1, wherein the base mass contains carbon black and wherein the proportion of carbon black is in particular a maximum of 35% by weight.

6. Graphite lead or graphite chalk or graphite block according to claim 1, wherein a lubricant and/or a surfactant and/or an emulsifier is contained as at least one additive and wherein the proportion of additives is in particular a maximum of 5% by weight.

7. Graphite lead or graphite chalk or graphite block according to claim 1, wherein the mixture of iso-paraffins and n-paraffins is contained in the waterproof preparation mixture in a concentration between 10 and 50% by weight.

8. Graphite lead or graphite chalk or graphite block according to claim 1, wherein the waterproof preparation mixture contains a fatty acid, in particular stearin or stearic acid.

9. Graphite lead or graphite chalk or graphite block according to claim 8, wherein the fatty acid is contained in the waterproof preparation mixture in a concentration between 25 and 70% by weight.

10. Graphite lead or graphite chalk or graphite block according to claim 1, wherein the waterproof preparation mixture contains triglycerides and/or further wax-like components, in particular fatty acid derivatives or polyolefin waxes or ethylene vinyl acetate wax.

11. Graphite lead or graphite chalk or graphite block according to claim 10, wherein the triglycerides or further wax-like components are contained in the waterproof preparation mixture in a maximum concentration of 40% by weight.

12. Pencil having a graphite lead according to claim 1, in particular a pencil with a sheathing made of wood or a wood substitute material, or a mechanical pencil.

13. Method for producing a graphite lead or graphite chalk or graphite block, comprising the following steps:
   a) Producing a base body from a base mass at least containing a cellulose-based binding agent, a filler, and graphite, in particular by
   a1) Mixing and homogenizing at least the binding agent, the filler, and the graphite to form the base mass,
   a2) Adding water to the base mass and homogenizing the mixture of base mass and water,
   a3) Extruding the base mass to form graphite lead strands and/or graphite chalk strands and/or graphite blocks,
   a4) Drying the extruded graphite leads and/or graphite chalks and/or graphite blocks,
   b) Impregnating the base body in a waterproof preparation mixture containing at least a mixture of iso-paraffins and n-paraffins or in a water-soluble preparation mixture containing at least a water-soluble emulsifier,
   c) Removing excess preparation mixture.

* * * * *